US012742871B2

(12) United States Patent
Shin

(10) Patent No.: US 12,742,871 B2
(45) Date of Patent: Sep. 22, 2026

(54) RADAR CONTROL DEVICE AND METHOD

(71) Applicant: HL KLEMOVE CORP., Incheon (KR)

(72) Inventor: Junsik Shin, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 280 days.

(21) Appl. No.: 18/437,372

(22) Filed: Feb. 9, 2024

(65) Prior Publication Data

US 2024/0288566 A1 Aug. 29, 2024

(30) Foreign Application Priority Data

Feb. 23, 2023 (KR) ........................ 10-2023-0024380

(51) Int. Cl.
*G01S 13/524* (2006.01)
*G01S 7/292* (2006.01)
*G01S 7/41* (2006.01)
*G01S 13/931* (2020.01)

(52) U.S. Cl.
CPC ........ *G01S 13/5248* (2013.01); *G01S 7/2923* (2013.01); *G01S 7/414* (2013.01); *G01S 13/931* (2013.01)

(58) Field of Classification Search
CPC .... G01S 13/5248; G01S 7/2923; G01S 7/414; G01S 13/931
See application file for complete search history.

(56) References Cited

U.S. PATENT DOCUMENTS 5,600,561 A 2/1997 Okamura
2015/0369912 A1* 12/2015 Kishigami ............. G01S 13/34 342/104
2016/0257342 A1* 9/2016 Ueda .................... B62D 15/026
2024/0017731 A1* 1/2024 Fasola .................... G07C 5/008
2024/0077617 A1* 3/2024 Lawson ................ G01S 13/584
2024/0351615 A1* 10/2024 Song ............... B60W 30/18163

FOREIGN PATENT DOCUMENTS

JP 7-225275 8/1995
JP 2005-182137 7/2005
JP 2012-233713 11/2012
JP 2014-93028 5/2014
JP 2015-55541 3/2015
JP 2017-56783 3/2017
JP 2019-70566 5/2019

OTHER PUBLICATIONS

Office Action dated Jun. 17, 2025 for Korean Patent Application No. 10-2023-0024380 and its English translation provided by Applicant's foreign counsel.

* cited by examiner

*Primary Examiner* — Nazra Nur Waheed
(74) *Attorney, Agent, or Firm* — WOMBLE BOND DICKINSON (US) LLP

(57) ABSTRACT

The embodiments relate to a radar control device and method. Specifically, a radar control device according to the embodiments may include a receiver configured to receive reception information for detecting objects around a host vehicle at predetermined periods, a detector configured to detect a clutter based on the reception information, and a determiner configured to estimate an estimated clutter in a second period based on a relative speed between a first clutter detected in a first period and the host vehicle, and determine an occupancy state of a lane around the host vehicle based on the estimated clutter.

20 Claims, 9 Drawing Sheets

RADAR CONTROL DEVICE AND METHOD

CROSS REFERENCE TO RELATED APPLICATION

This application claims priority from Korean Patent Application No. 10-2023-0024380, filed on Feb. 23, 2023, which is hereby incorporated by reference for all purposes as if fully set forth herein.

TECHNICAL FIELD

The embodiments of the present disclosure relate to a radar control device and method.

Recently, there is increasing the number of vehicles equipped with a radar which detects objects using electromagnetic waves. An electronic control unit of the vehicle may calculate a distance, a relative speed, and a relative angle between an object around the vehicle and the vehicle based on information output from a radar installed in the vehicle.

The vehicle equipped with a radar may provide various safety functions or convenience functions by using a distance, a relative speed, and a relative angle between objects around the vehicle and the vehicle.

For example, there may be provided a collision avoidance function during parking or stop, a smart cruise function while driving, or an automatic parking function by determining a distance, a relative speed, and a relative angle between an object around the vehicle and the vehicle based on information output from a radar installed in the vehicle.

The smart cruise function may refer to a system capable of detecting the distance to a preceding vehicle using a radar installed in the vehicle and maintaining a safe distance from the preceding vehicle by decelerating or accelerating the host vehicle based on the detected result. For the smart cruise function, there may be only necessary to accurately estimate the position and speed of the preceding vehicle. However, there may be required to develop a technology for controlling the vehicle at an appropriate braking time for an automatic lane change and an emergency steering avoidance function due to changes in technical requirements.

SUMMARY

In this background, an object of the present disclosure is to provide a radar control device and method capable of performing target separation beyond radar resolution by estimating the position and size of a clutter.

In an aspect of the present disclosure, there is provided a radar control device including a receiver configured to receive reception information for detecting objects around a host vehicle at predetermined periods, a detector configured to detect a clutter based on the reception information, and a determiner configured to estimate an estimated clutter in a second period based on a relative speed between a first clutter detected in a first period and the host vehicle, and determine an occupancy state of a lane around the host vehicle based on the estimated clutter.

In another aspect of the present disclosure, there is provided a radar control method including receiving, by a receiver, reception information obtained by detecting objects around a host vehicle at predetermined periods, detecting, by a detector, a clutter based on the reception information, and estimating, by a determiner, an estimated clutter in a second period based on a relative speed between a first clutter detected in a first period and the host vehicle, and determining an occupancy state of a lane around the host vehicle based on the estimated clutter.

The radar control device and method according to embodiments may provide surrounding information to a driver more quickly and accurately by detecting clutter at a distance greater than a detection range of a radar, and may provide more reliable information to the driver by determining a validity of an estimated clutter.

DETAILED DESCRIPTION

Figure 1:
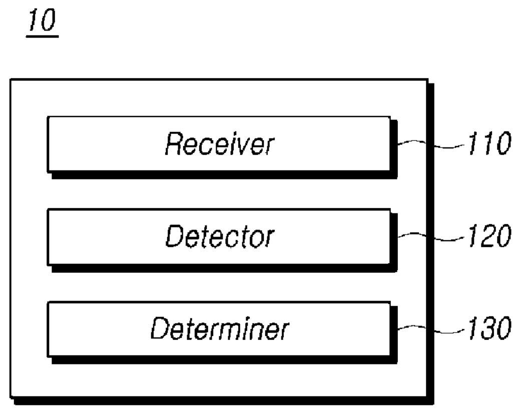
FIG. 1 is a schematic diagram for explaining a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element.

Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a schematic diagram for explaining a radar control device 10 according to an embodiment of the present disclosure.

The radar control device 10 of the present disclosure may include a receiver 110, a detector 120, and a determiner 130.

In one embodiment, the radar control device 10 may be an advance driver assistance system (ADAS) capable of providing information to assist the driving of a host vehicle or providing assistance for the driver's control of the host vehicle.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar control device 10 according to the present disclosure may be mounted in each of a manned vehicle in which a driver controls the vehicle and an autonomous driving vehicle.

The receiver 110 may receive reception information obtained by detecting objects around a host vehicle at each predetermined period.

For example, the receiver 110 may receive reception information obtained by detecting objects around the host vehicle from a radar installed in the host vehicle.

Here, the radar may include an antenna unit, a radar transmitter, and a radar receiver.

Specifically, the antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The radar transmitter may provide a function of transmitting a transmission signal through a switched transmission antenna by switching to one of a plurality of transmission antennas included in the antenna unit or transmitting a transmission signal through a multi-transmission channel allocated to the plurality of transmission antennas.

The radar transmitter may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The radar receiver may receive a reception signal received by being reflected from an object through a receiving antenna.

In addition, the radar receiver may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The radar receiver may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

As another example, the receiver 110 may control the radar, output a control signal to be transmitted to the radar, and receive a reception signal from the radar.

In the present disclosure, a period may mean a time period from the time the radar transmitter transmits the transmission signal, after the radar receiver receives the reception signal and processes the received signal, and until the radar transmitter transmits the next transmission signal again. In addition, in the present disclosure, a first period may be expressed as a first scan and a second period may be expressed as a second scan.

Figure 2:
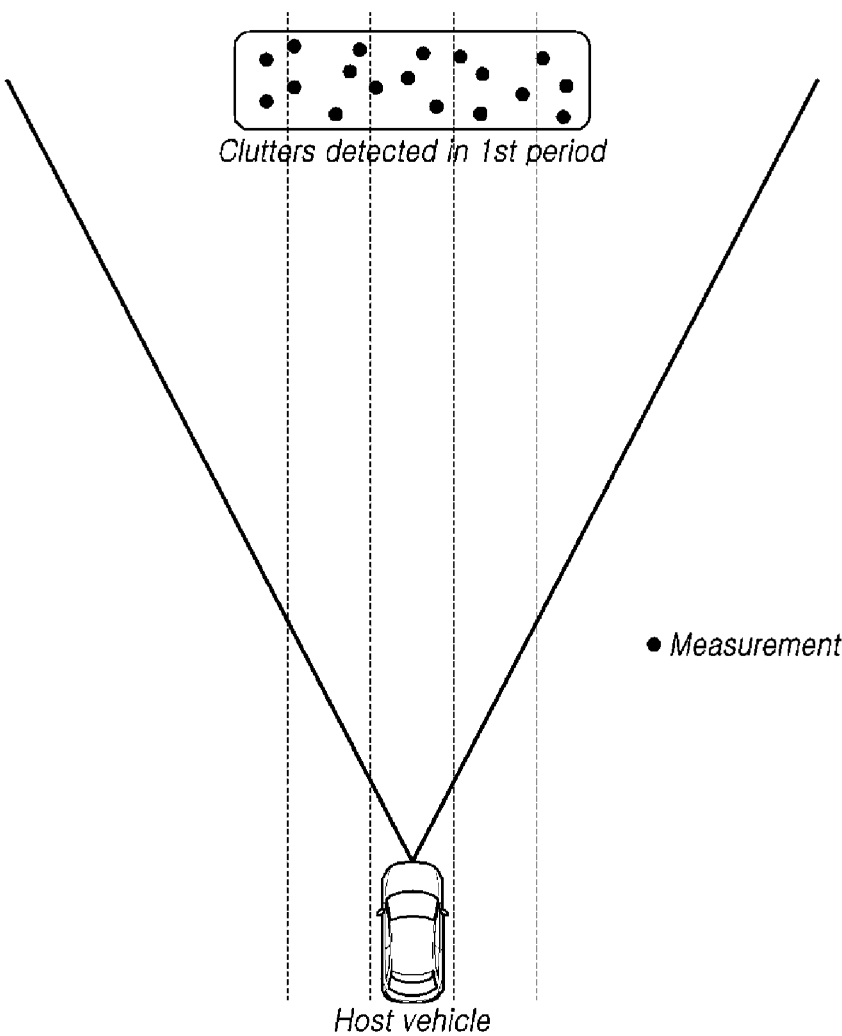
FIG. 2 is a diagram for explaining a detection of clutters by a radar control device according to an embodiment.

FIG. 2 is a diagram for explaining a detection of clutters by radar control device 10 according to an embodiment.

Referring to FIG. 2, the detector 120 may detect clutter based on reception information.

The detector 120 may detect at least one measurement based on the reception information, and detect the clutter through density-based spatial clustering of applications with noise (DBSCAN) for the measurement.

Here, the detector 120 may calculate a measurement by performing Fast Fourier Transform (FFT) on the reception signal. Specifically, the detector 120 may perform a first-order FFT to convert a frequency to a range-time index, and may perform a second-order FFT to convert into a range-Doppler index so as to determine the measurement.

The determiner 130 may estimate an estimated clutter in a second period based on a relative speed between a first clutter detected in a first period and the host vehicle, and may determine an occupancy state of a lane around the host vehicle based on the estimated clutter.

The determiner 130 may determine that the lane is occupied if a lateral size of the estimated clutter occupied in one lane is greater than a width of the host vehicle.

Figure 3:
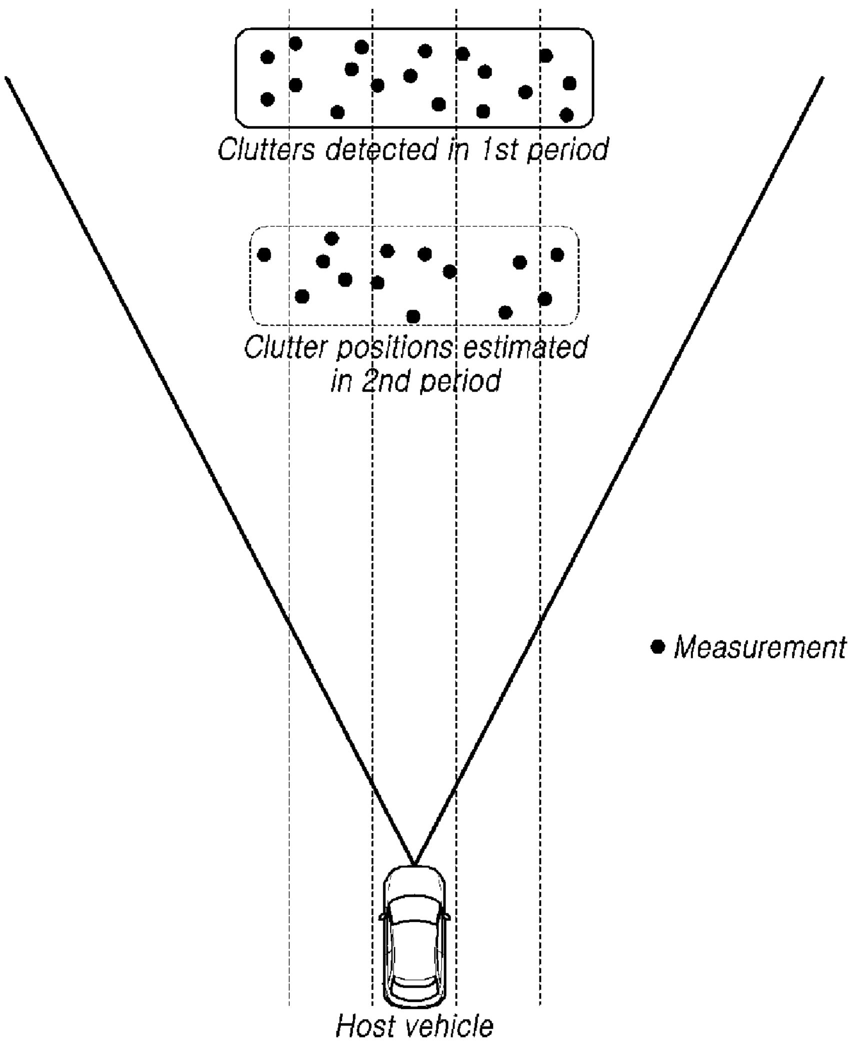
FIG. 3 is a diagram for explaining estimated clutter in a second period according to an exemplary embodiment.

FIG. 3 is a diagram for explaining estimated clutter in a second period according to an exemplary embodiment.

Referring to FIG. 3, the determiner 130 may estimate an estimated clutter in a second period based on a first clutter. Here, the estimated clutter may mean a position where the first clutter is expected to be in the second period or an estimated clutter to be present at that position.

Here, the second period may be a period when a second clutter is detected within a specific distance from the host vehicle. The specific distance may be, for example, a distance a distance that can be identified according to the resolution of a radar mounted on the vehicle.

The estimated clutter of the first clutter in the second period becomes closer to the first clutter as the vehicle travels, and a size or a magnitude of the first clutter in the first period and a size of the first clutter after n periods may be different from each other. The degree of change in the size of the clutter may be determined by the specifications of the radar sensor.

The above-described change in the size of the clutter may be expressed by Equation 1 below.

$$\bar{y}=R\sin(\Delta\theta) \quad \text{[Equation 1]}$$

Here, $\bar{y}$ may be a lateral position error, $\Delta\theta$ may be an angular error of the radar, and R may be a distance between the radar and the clutter. Here, a distance between the host vehicle and the clutter may be calculated based on the relative speed between the host vehicle and the clutter. Here, the relative speed may be calculated as an average of relative speeds between the vehicle and a plurality of measurements included in the first clutter.

According to Equation 1 described above, since the lateral position error decreases in proportion to the distance R between the radar and the clutter, the determiner 130 may predict a size of the clutter according to the distance.

The determiner 130 may further determine a validity of the estimated clutter and determine an occupancy state of a lane only if the estimated clutter is valid.

Accordingly, the radar control device 10 of the present disclosure may assist the driver's steering determination by determining the occupancy state of the lane at a distance greater than the resolution of the radar.

Figure 4:
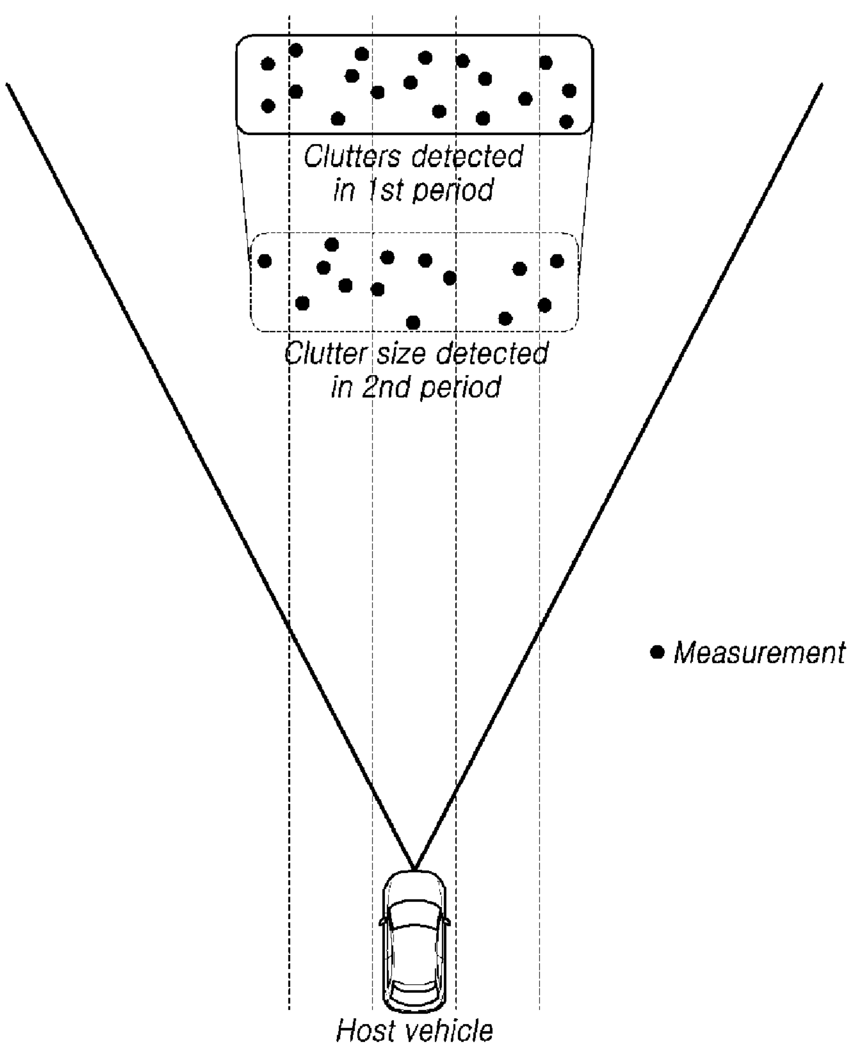
FIG. 4 is a diagram for explaining clutter detected in a second period according to an exemplary embodiment.

FIG. 4 is a diagram for explaining clutter detected in a second period according to an exemplary embodiment.

Referring to FIG. 4, in one embodiment, the determiner 130 may determine a validity of the estimated clutter based on a difference in lateral size between the estimated clutter and a second clutter detected in a second period.

The validity determination of the estimated clutter may be expressed by Equation 2 below.

$$|w_{clu} - w_{est}| < th \quad \text{[Equation 2]}$$

Here, $W_{clu}$ may be a second clutter detected in the second period, and $W_{est}$ may be the estimated clutter estimated in the second period.

The determiner 130 may determine that the estimated clutter is valid if a difference in the lateral size between the second clutter and the estimated clutter is less than a specific size. In addition, the determiner 130 may determine the occupancy state of the lanes around the host vehicle according to whether the estimated clutter occupies the adjacent lanes.

That is, if the difference in the lateral size between the second clutter and the estimated clutter is less than a preset specific size, the determiner 130 may determine a lane occupied by the estimated clutter as the occupied lane.

As described above, the radar control device 10 of the present disclosure may improve reliability of the estimated clutter by comparing the estimated clutter with the second clutter detected by the radar, and provide more accurate information to the driver.

In another embodiment, the determiner 130 may calculate a validity level by performing data-driven on the estimated clutter, and determine the validity of the estimated clutter based on the validity level.

In this case, the determiner 130 may learn using a generative adversarial network (GAN) to accumulate training data. Here, a generator (not shown) and a classifier (not shown) compete with each other inside the adversarial generative neural network, and two data-driven models can be sequentially and alternately learned. The data-driven model may receive the estimated clutter and output a validity level.

As described above, the determiner 130 may determine that the estimated clutter is valid if the validity level of the estimated clutter is greater than or equal to a specific level.

Accordingly, the radar control device 10 of the present disclosure may provide a more accurate lane occupancy state to the driver by further determining the validity of the estimated clutter through data-driven method.

Figure 5:
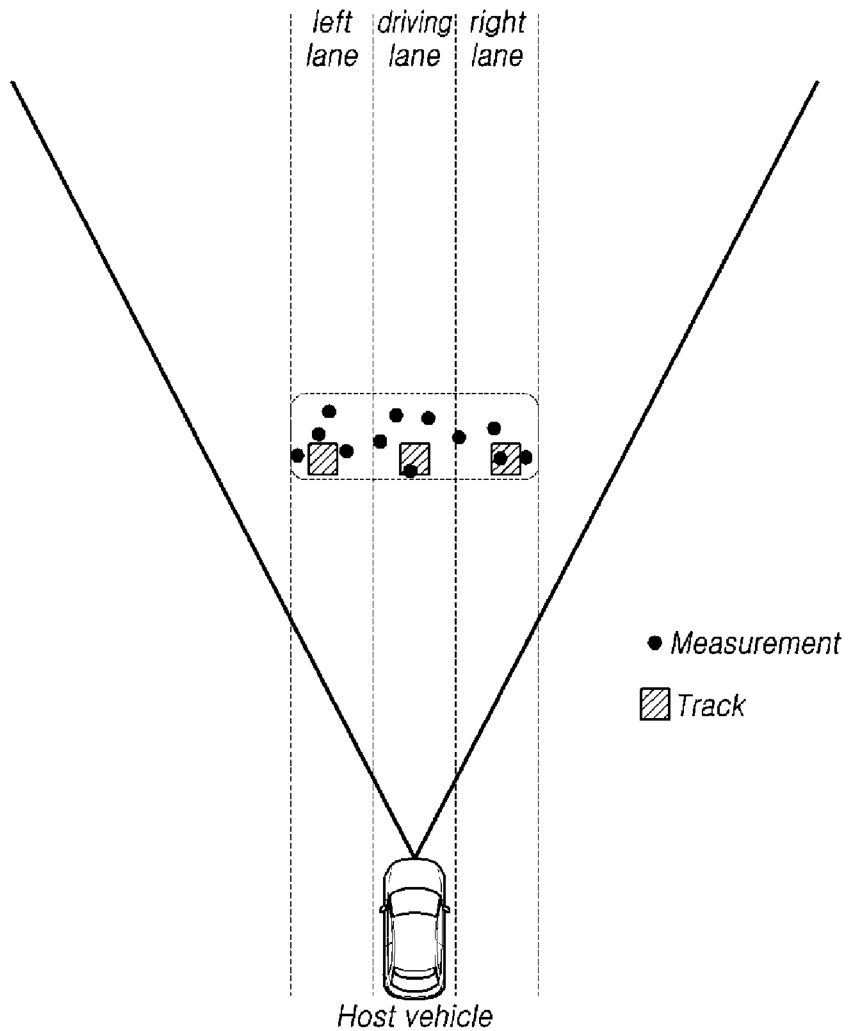
FIG. 5 is a diagram for explaining setting each track for estimated clutter occupied in each lane according to an exemplary embodiment.

FIG. 5 is a diagram for explaining setting each track for estimated clutter occupied in each lane according to an exemplary embodiment.

Referring to FIG. 5, if the estimated clutter occupies a plurality of lanes, the determiner 130 may set a track for each lane, and determine a lane occupancy state of a lane corresponding to the track based on the position of the set track.

Here, the track may be generated or created based on raw data and measurements.

The determiner 130 may generate at least one track in each lane. Alternatively, two tracks may be generated in one lane.

The determiner 130 may determine that the corresponding lane is not occupied if the generated track deviates from the lane or no more tracks are generated in the lane.

The determiner 130 may output information about the generated track to a steering control device that controls steering of the host vehicle. The steering control device may receive track information and control steering of the host vehicle in consideration of the track information.

In one embodiment, the radar control device 10 may output a control command for steering of the host vehicle according to the occupancy state of the track. For example, if the driving lane in which the host vehicle is traveling is occupied by clutter and the left lane is not occupied by clutter, the radar control device 10 may control steering to perform a lane change to the left lane.

In one embodiment, the radar control device 10 may be implemented as an electronic control unit (ECU). The electronic control unit may include at least one or more elements of one or more processors, memories, storage units, user interface input units, and user interface output units, which may communicate with each other through a bus. Additionally, the computer system may also include a network interface for connecting to a network. A processor may be a CPU or semiconductor device that executes processing instructions stored in memory and/or storage. The memory and storage may include various types of volatile/non-volatile storage media. For example, memory may include ROM and RAM.

Hereinafter, it will be described a radar control method using the radar control device 10 capable of performing all functions as above-described in the present disclosure.

Figure 6:
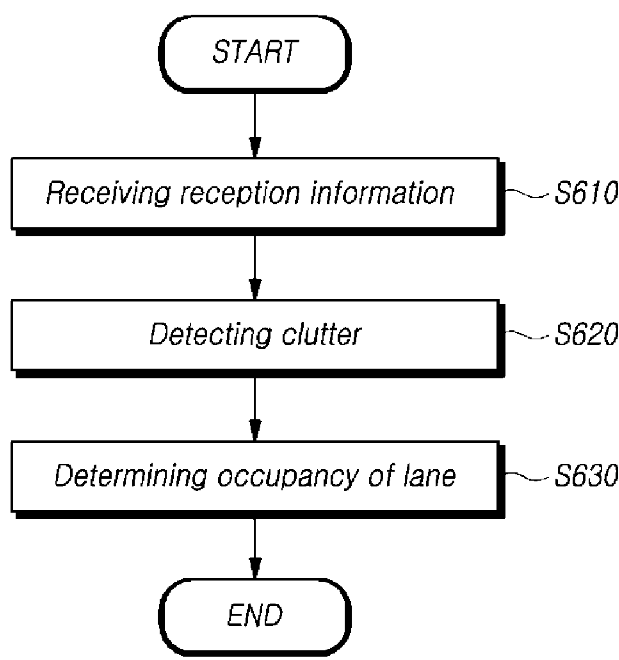
FIG. 6 is a flowchart illustrating a radar control method according to an embodiment of the present disclosure.

FIG. 6 is a flowchart illustrating a radar control method according to an embodiment of the present disclosure.

Referring to FIG. 6, the radar control method according to the present disclosure may include receiving, by a receiver, reception information obtained by detecting objects around a host vehicle at predetermined periods (S610), detecting, by a detector, a clutter based on the reception information (S620), and estimating, by a determiner, an estimated clutter in a second period based on a relative speed between a first clutter detected in a first period and the host vehicle, and determining an occupancy state of a lane around the host vehicle based on the estimated clutter (S630).

In the reception information receiving step (S610), the receiver 110 may receive reception information about detecting an object around the host vehicle from a radar sensor installed in the host vehicle at predetermined periods or intervals.

In the clutter detection step (S620), the detector may calculate at least one measurement based on the reception information, and may detect clutter through a density-based spatial clustering of applications with noise (DBSCAN) on the measurements. In addition, the relative speed may be determined based on an average of relative speeds between the vehicle and a plurality of measurements included in the first clutter.

In the lane occupancy determination step S630, the determiner may further determine a validity of the estimated clutter and determine an occupancy state of a lane only if the estimated clutter is valid. Accordingly, it is possible to increase the reliability of the estimated clutter.

In the lane occupancy determination step S630, the determiner may determine the validity of the estimated clutter based on a difference in lateral size between the estimated clutter and a second clutter detected in a second period. In the lane occupancy determination step (S630), the determiner may determine the lane occupied by the estimated clutter as the occupied lane if the difference in lateral size is less than a specific size. Here, the second period may be a period when a second clutter is detected within a specific distance from the vehicle.

In the lane occupancy determination step (S630), the determiner may calculate a validity level by performing data-driven operation on the estimated clutter, and determine the validity of the estimated clutter based on the validity level.

In the lane occupancy determination step (S630), if the estimated clutter occupies a plurality of lanes, the determiner may generate a track for each lane, and determine the occupancy state of a lane corresponding to the track based on the position of the generated track.

In the lane occupancy determination step (S630), if a lateral size of the estimated clutter occupied in one lane is greater than a width of the host vehicle, the determiner may determine that the lane is occupied.

Figure 7:
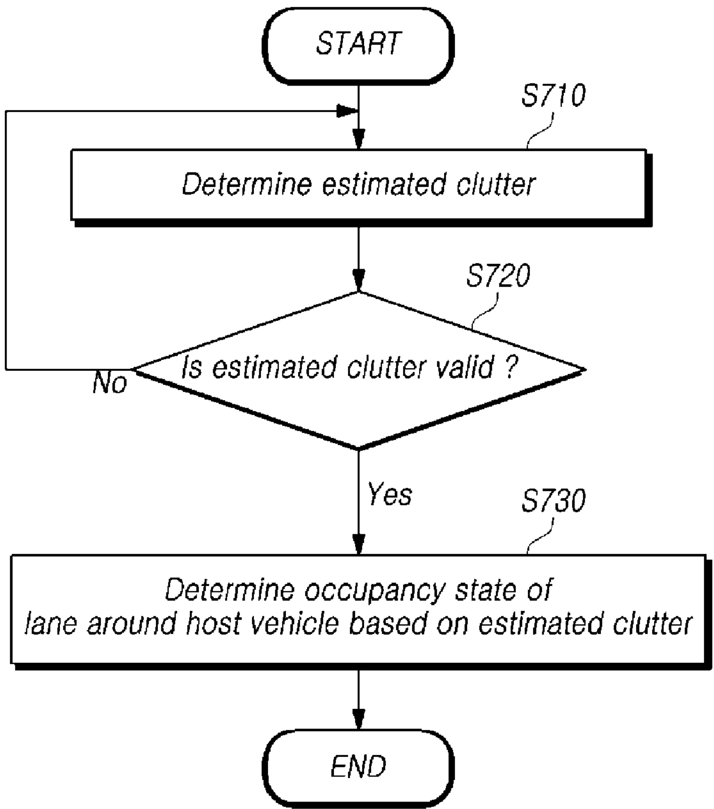
FIG. 7 is a diagram for explaining step S630 in detail according to an embodiment.

FIG. 7 is a diagram for explaining step S630 in detail according to an embodiment.

Referring to FIG. 7, the radar control device 10 may determine an estimated clutter in a second period based on a first clutter (S710). Here, the second period may be a period in which the second clutter is detected at a distance capable of resolution of a radar sensor mounted in the vehicle.

The radar control device 10 may determine whether the estimated clutter is valid (S720). According to the present disclosure, it is possible to improve the reliability of information provided to a driver by determining the validity of the estimated clutter.

In the case that the estimated clutter is determined to be valid (Yes in S720), the radar control device 10 may determine the occupancy state of the lanes around the host vehicle based on the estimated clutter. For example, the radar control device 10 may compare the lateral size of the estimated clutter occupied in each lane with a width of the host vehicle, and may determine that the lane is occupied if the estimated clutter size occupied in the lane is greater than the width of the host vehicle.

If it is determined that the estimated clutter is not valid (No in S720), the radar control device 10 may re-determine an estimated clutter in the second period based on the first clutter.

Figure 8:
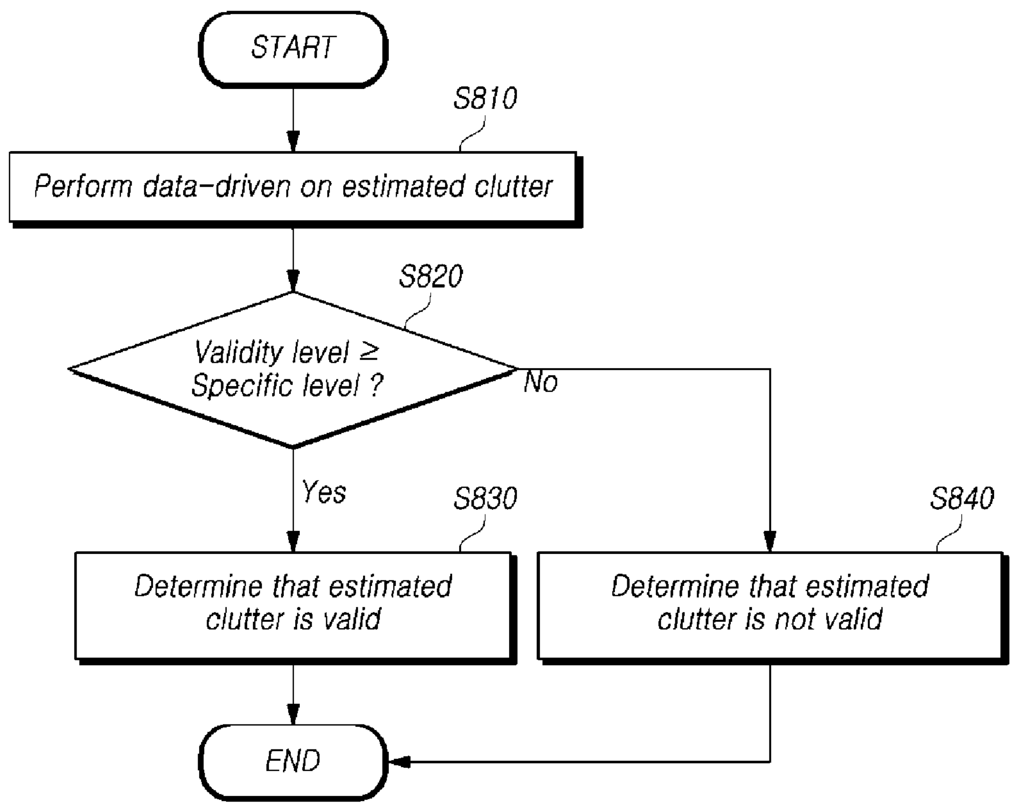
FIG. 8 is a flowchart for explaining step S720 in more detail according to an embodiment.

FIG. 8 is a flowchart for explaining step S720 in more detail according to an embodiment.

Referring to FIG. 8, the radar control device 10 may perform data-driven operation on the estimated clutter and calculate a validity level (S810).

If the calculated validity level is equal to or greater than the specific level (Yes in S810), the radar control device 10 may determine that the estimated clutter is valid (S820). This estimated clutter may be used as training data again.

If the calculated validity level is less than the specific level (No in S810), the radar control device 10 may determine that the estimated clutter is not valid (S840). In this case, the radar control device 10 may perform re-determination of the estimated clutter.

Figure 9:
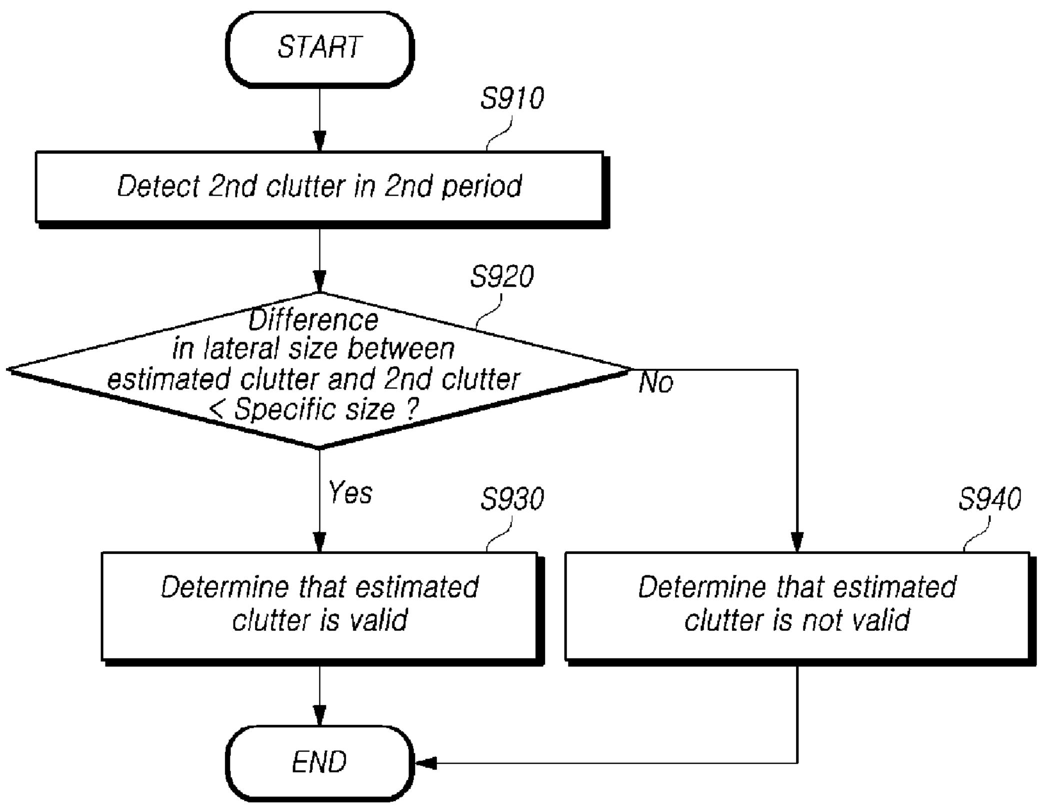
FIG. 9 is a flowchart for explaining step S720 in detail according to another embodiment.

FIG. 9 is a flowchart for explaining step S720 in detail according to another embodiment.

Referring to FIG. 9, the radar control device 10 may detect a second clutter in a second period. Here, the second clutter may be the same object as the clutter in the first period.

The radar control device 10 may determine whether a lateral size difference between the estimated clutter and the second clutter is less than a specific size by using Equation 1 described above (S920).

If the lateral size difference between the estimated clutter and the second clutter is less than a specific size (Yes in S920), the radar control device 10 may determine that the estimated clutter is valid (S930). Since there is little difference between the result detected by the actual radar sensor and the size of the estimated clutter, the radar control device 10 may determine that the estimated clutter is valid.

If the lateral size difference between the estimated clutter and the second clutter is greater than or equal to a specific size (No in S920), the radar control device 10 may determine that the estimated clutter is not valid (S940). In this case, the radar control device 10 may re-determine the estimated clutter based on the first clutter.

As described above, according to the radar control device and method of the present disclosure, it is possible to provide surrounding information to the driver more quickly by detecting clutter at a distance greater than the detection range of the radar, and improve the reliability of information provided to the driver by determining the validity of the estimated clutter.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:

a receiver configured to receive reception information for detecting objects around a host vehicle at predetermined periods;

a detector configured to detect a clutter based on the reception information, detect a first clutter in a first period, and detect a second clutter in a second period different from the first period; and a determiner configured to estimate an estimated clutter in the second period based on a relative speed between the first clutter detected in the first period and the host vehicle, determine a lateral size of the estimated clutter and a lateral size of the second clutter, and determine an occupancy state of a lane around the host vehicle based on a difference between the lateral size of the estimated clutter and the lateral size of the second clutter.

2. The radar control device of claim 1, wherein the determiner further determines validity of the estimated clutter, and determines the occupancy state of the lane only if the estimated clutter is valid.

3. The radar control device of claim 2, wherein the determiner determines validity of the estimated clutter based on the difference between the lateral size of the estimated clutter estimated in the second period and the lateral size of the second clutter detected in the second period.

4. The radar control device of claim 3, wherein the determiner determines a lane occupied by the estimated clutter as an occupied lane if the difference in the lateral size is less than a specific size.

5. The radar control device of claim 3, wherein the second period is a period in which the second clutter is detected within a specific distance from the host vehicle.

6. The radar control device of claim 2, wherein the determiner calculates a validity level by using a data-driven model, which receives information on the estimated clutter and outputs the validity level of the estimated clutter, and determines the validity of the estimated clutter based on the validity level.

7. The radar control device of claim 1, wherein, if the estimated clutter occupies a plurality of lanes, the determiner generates a track for each lane, and determines the occupancy state of a lane corresponding to the track based on a position of the generated track.

8. The radar control device of claim 1, wherein the detector determines at least one measurement based on the reception information, and detects the clutter through a density-based spatial clustering of applications with noise (DBSCAN) for the measurements.

9. The radar control device of claim 8, wherein the relative speed is determined as an average of relative speeds between the host vehicle and a plurality of measurements included in the first clutter.

10. The radar control device of claim 1, wherein, if a lateral size of the estimated clutter occupied in one lane is greater than a width of the host vehicle, the determiner determines that the corresponding lane is occupied.

11. A radar control method comprising:

receiving, by a receiver, reception information obtained by detecting objects around a host vehicle at predetermined periods;

detecting, by a detector, a clutter based on the reception information, detecting a first clutter in a first period, and detecting a second clutter in a second period different from the first period;

estimating, by a determiner, an estimated clutter in the second period based on a relative speed between the first clutter detected in the first period and the host vehicle, determining a lateral size of the estimated clutter and a lateral size of the second clutter; and determining an occupancy state of a lane around the host vehicle based on a difference between the lateral size of the estimated clutter and the lateral size of the second clutter.

12. The radar control method of claim 11, wherein the determining of the occupancy state of the lane comprises further determining validity of the estimated clutter, and determining the occupancy state of the lane only if the estimated clutter is valid.

13. The radar control method of claim 12, wherein the determining of the occupancy state of the lane comprises determining validity of the estimated clutter based on the difference between the lateral size of the estimated clutter estimated in the second period and the lateral size of the second clutter detected in the second period.

14. The radar control method of claim 13, wherein the determining of the occupancy state of the lane comprises determining a lane occupied by the estimated clutter as an occupied lane if the difference in the lateral size is less than a specific size.

15. The radar control method of claim 13, wherein the second period is a period in which the second clutter is detected within a specific distance from the host vehicle.

16. The radar control method of claim 12, wherein the determining of the occupancy state of the lane comprises calculating a validity level by using a data-driven model, which receives information on the estimated clutter and outputs the validity level of the estimated clutter, and determining the validity of the estimated clutter based on the validity level.

17. The radar control method of claim 11, wherein, if the estimated clutter occupies a plurality of lanes, the determining of the occupancy state of the lane comprises generating a track for each lane, and determining the occupancy state of a lane corresponding to the track based on a position of the generated track.

18. The radar control method of claim 11, wherein the detecting of the clutter comprises determining at least one measurement based on the reception information, and detecting the clutter through a density-based spatial clustering of applications with noise (DBSCAN) for the measurements.

19. The radar control method of claim 18, wherein the relative speed is determined as an average of relative speeds between the host vehicle and a plurality of measurements included in the first clutter.

20. The radar control method of claim 11, wherein, if a lateral size of the estimated clutter occupied in one lane is greater than a width of the host vehicle, the determining of the occupancy state of the lane comprises determining that the corresponding lane is occupied.

* * * * *